Patented June 3, 1952

2,599,000

UNITED STATES PATENT OFFICE 2,599,000

N,N-DISUBSTITUTED-BETA-HALO-ALKYLAMINES

James F. Kerwin and Glenn E. Ullyot, Philadelphia, Pa., assignors to Smith, Kline & French Laboratories, Philadelphia, Pa., a corporation of Pennsylvania No Drawing. Application September 2, 1950, Serial No. 183,093

6 Claims. (Cl. 260—570.7)

This invention relates to certain new chemical compounds, more particularly certain new halogen-containing amines and organic and inorganic salts thereof.

The new chemical compounds according to this invention have utility as physiologically active agents and, more particularly, have adrenolytic or sympatholytic activity.

The new compounds according to this invention have the structure shown by the following formula:

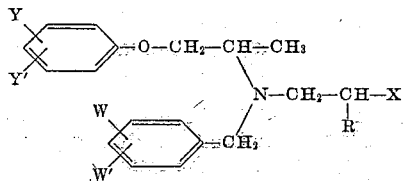

in which:

Y and Y' are members of the group consisting of hydrogen, alkyl containing not more than 4 carbon atoms, benzyl, hydroxy, methoxy, benzyloxy, fluorine, chlorine and bromine.

W and W' are members of the group consisting of hydrogen, methyl, methoxy and chlorine.

R is a member of the group consisting of hydrogen and methyl.

X is a member of the group consisting of chlorine and bromine.

Where hereinafter the symbols Y, Y', W, W', R and X are mentioned, they will indicate the substituents indicated for them in connection with the above general formula.

The organic and inorganic salts contemplated by this invention include by way of example salts of the bases formed with organic acids such, for example, as glycolic, oxalic, maleic, camphorsulfonic, etc. and inorganic acids such as, for example, sulfamic, hydrochloric, hydrobromic, sulfuric, phosphoric, etc. More specifically, the inorganic and organic salts will be such as are prepared with inorganic and organic acids having an ionization constant not less than $1 \times 10^{-2}$ at 18° C.

The compounds in accordance with this invention and as identified by the above structural formula may be prepared variously by one of four general methods, from the following general description of which procedure for the preparation of all of the several compounds will be apparent to those skilled in the art.

The compounds used as starting materials for the synthesis of compounds of this invention are either known substances or, being made obvious, can be prepared by well known methods.

METHOD A

A propylene halohydrin or propylene oxide is added to the sodium salt of a phenol of the type

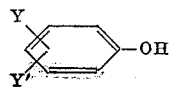

in refluxing alcohol to form the alcohol having the formula:

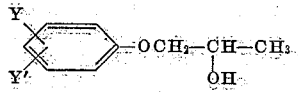

This same alcohol may also be obtained by reducing the corresponding ketone with hydrogen in the presence of a suitable hydrogenation catalyst, as, for example, platinum, palladium, or activated nickel (reference: Hurd & Perletz: J. A. C. S. 68, 38 (1946).

The halide, formed by treating the alcohol with a suitable halogenating agent such as, for example, thionyl chloride, thionyl bromide, etc., is added to ethanolamine or isopropanolamine. When the resulting mixture is heated, the temperature employed depending upon the reactivity of the halide chosen, there is formed the N-substituted amino alcohol of the formula

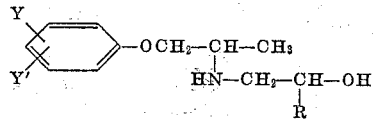

In this process it is advantageous to employ an excess of the primary amino alcohol.

The benzyl, or substituted benzyl group is introduced into the molecule by heating together the secondary amino alcohol produced above with a benzyl halide or a substituted benzyl halide. This may be carried out either in the presence of excess amino alcohol, or in the presence of an acid binding agent such as potassium carbonate. In most cases the reaction is conveniently carried out in a suitable solvent such as ethyl alcohol, toluene, etc., but it may be carried out without such a solvent.

Finally, the hydroxyl group of the amino alcohol

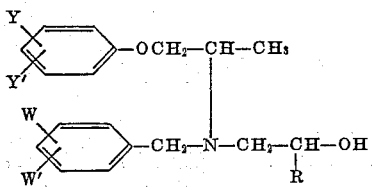

is replaced by a halogen radical X, as in the general formula above. The alcohol is reacted with a halogenating agent such as thionyl chloride or thionyl bromide to yield the product in the form of its hydrohalide salt. An excess of thionyl halide may be employed as solvent for this reaction or chloroform, benzene or other suitable solvent may be used.

METHOD B

The secondary amino alcohol produced as in Method A above may also be obtained by means of the following reaction:

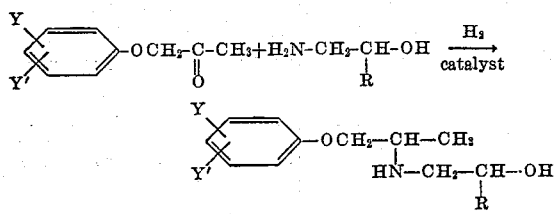

This reduction may be carried out by dissolving equimolar quantities of ketone and amine in a solvent as, for example, methyl alcohol, ethyl alcohol, cyclohexane, etc. The solution should be agitated under hydrogen pressure in the presence of a suitable hydrogenation catalyst such as platinum, palladium or activated nickel.

The amino alcohol so produced may be treated as in Method A above to introduce the benzyl or substituted benzyl radical and the resulting product may then be treated as in the final step in Method A to obtain the halide.

METHOD C

The ketones used as starting materials in Method B may also be used in the reaction

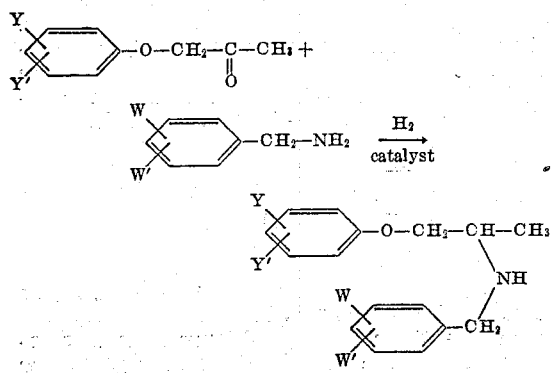

which may be carried out in the same manner as described in Method B above. The secondary amine resulting may then be reacted with ethylene or propylene halohydrin either in absence of a solvent, or in the presence of a solvent such as ethyl alcohol, benzene, toluene or xylene. Unless one employs an excess of the amine, it will be advantageous to use an acid binding agent such as potassium carbonate, sodium bicarbonate, or magnesium oxide:

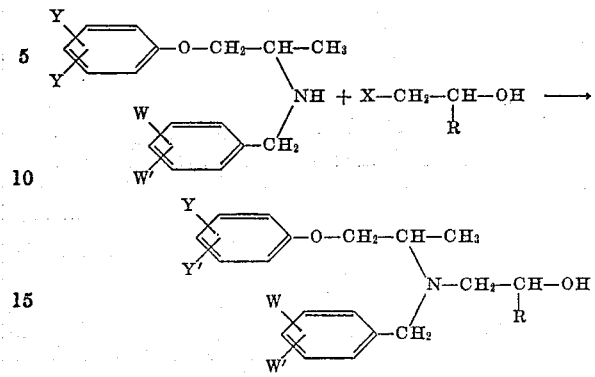

If desired, the tertiary amino alcohol may also be formed by heating the secondary amine together with an ethylene or propylene oxide; rather than utilizing the ethylene or propylene halohydrin in the reaction.

The product of this reaction may then be reacted with a thionyl halide as in Method A to replace the hydroxyl group with the halide radical.

METHOD D

The secondary amine

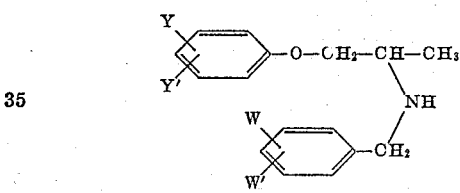

prepared in Method C above may also be made by an alternative method. This involves treating a primary amine of the type

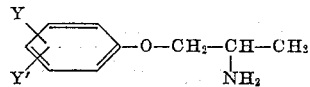

with a benzaldehyde or a substituted benzaldehyde and reducing the resulting mixture as described in Method B above. The tertiary amino alcohol is formed from the secondary amine by the use of either an alkylene halohydrin or an alkylene oxide as described in Method C, which amino alcohol is treated as in Method A to form the corresponding halide.

The following examples will be illustrative of the various types of compounds and of specific compounds in accordance with the invention and procedure for their preparation and will, it is believed, serve to make fully apparent all of the compounds embraced by the general formula given above and the preparation thereof, respectively, it being noted that the utility indicated for the several compounds flows from the elements of the general structure common to all of them.

*Example 1*

N-(phenoxyisopropyl)-N-benzyl-β-chlorethylamine hydrochloride:

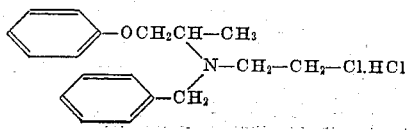

This compound will be prepared by Method A above as follows:

*Step 1.*—In a 500 ml. flask equipped with gas inlet tube, dropping funnel and reflux condenser is placed 139 g. of 1-phenoxy-2-propanol. A stream of dry air is bubbled through the alcohol while 55 g. of thionyl chloride is added dropwise with external cooling. The stream of dry air is continued for about six hours or until most of the hydrogen chloride has been expelled and then another 55 g. of thionyl chloride is added. The reaction mixture is allowed to stand twenty-four hours, a few drops of pyridine are added and the mixture heated four hours on the steam bath. The cooled reaction mixture is poured into water, the crude product is washed with dilute sodium bicarbonate solution and finally taken up in benzene. The benzene is distilled at ordinary pressure and the residue distilled in vacuo to yield 60–70% of 1-phenoxy-2-chloropropane, B. P. 93–94° C./5 mm.

*Step 2.*—To 494 g. of ethanolamine, heated to approximately 150° C. in a 500 ml. flask equipped with stirrer, condenser and dropping funnel, is added 465 g. of 1-phenoxy-2-chloropropane with mechanical stirring. The reaction mixture is then heated to reflux for three hours, cooled and poured into a liter of water. The organic layer is extracted into ether and the ether solution is extracted with dilute hydrochloric acid. The aqueous acid solution is then made alkaline with 40% sodium hydroxide solution and the organic base is extracted into ether. Removal of the ether leaves N-(phenoxyisopropyl)-ethanolamine which, after recrystallization from hexane, melts at 70.5–72° C.

*Step 3.*—To 43 g. of N-(phenoxyisopropyl) ethanolamine dissolved in 500 ml. of alcohol in a 1000 ml. flask equipped with stirrer and condenser is added 28 g. of benzyl chloride and 18.5 g. of sodium bicarbonate. The mixture is stirred and refluxed for ten hours and then approximately half the alcohol is removed by distillation. The remaining solution is poured into 500 ml. of water and the organic material extracted with three 100 ml. portions of ether. The combined ether extracts are washed with water, dried over anhydrous potassium carbonate and filtered. After removal of the ether, the residue is distilled in vacuo to yield N-(phenoxyisopropyl)-N-benzylethanolamine, B. P. 163–168° C./0.2 mm.

*Step 4.*—A solution of 20 g. of the above amino alcohol is dissolved in 50 ml. of dry chloroform and treated with dry hydrogen chloride until acid. Then a solution of 9 g. of thionyl chloride in 50 ml. of dry chloroform is added and the reaction mixture is heated by a water bath at 50–60° C. for two hours. Most of the chloroform is removed by distillation under reduced pressure. Addition of ether to the residue causes the product to crystallize. After recrystallization from a mixture of alcohol and ether, the N-(phenoxyisopropyl)-N-benzyl-β-chloroethylamine hydrochloride melts at 137.5–140° C.

The free base of N-phenoxyisopropyl-N-benzyl-β-chlorethylamine hydrochloride can be liberated in the following manner. Thirty-four grams of the hydrochloride is suspended in 200 ml. of water containing 4.0 g. of sodium hydroxide and the mixture is shaken with 100 ml. of benzene. After the solid disappears, the benzene layer is separated, dried over anhydrous sodium sulfate, filtered and the solvent distilled at reduced pressure. The free base which remains solidifies when chilled and is recrystallized from petroleum ether. The recrystallized N-phenoxyisopropyl-N-benzyl-β-chlorethylamine melts at 38–40° C.

*Example 2*

N - (o - methylphenoxyisopropyl) - N - benzyl - β-chlorethylamine hydrochloride:

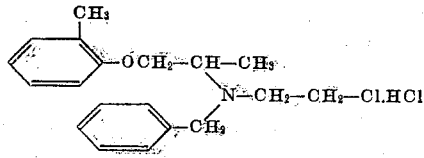

This compound will be prepared by Method A above as follows:

One mole of o-cresol and 300 ml. of alcohol are placed in a flask fitted with stirrer, reflux condenser and dropping funnel. A solution of 40 g. of sodium hydroxide in 40 ml. of water is added, the solution of sodium o-cresoate is heated to refluxing and one mole of propylene chlorohydrin is added with stirring over a two hour period. After the addition is complete, the reaction mixture is refluxed an additional five hours. Most of the alcohol is removed by distillation under diminished pressure, the residue is dissolved in benzene and washed several times with water and then with 10% sodium hydroxide solution. The benzene is then distilled and the residue is distilled in vacuo. 1-(o-methyl-phenoxy)-2-propanol distils at 86–88° C./2 mm. The p-nitrobenzoate ester melts at 95.5–96° C.

The end product is formed from 1-(o-methylphenoxy)-2-propanol as in the manner described under Example 1 by halogenation with thionyl chloride to form 1-(o-methylphenoxy)-2-chloropropane, B. P. 94–95° C./3 mm., which, in turn, is reacted with ethanolamine to form the secondary amino alcohol 1-(o-methylphenoxy)-2-propyl ethanolamine, M. P. 57.5–59° C. The benzyl group is introduced by heating the secondary amino alcohol with benzyl chloride. The resulting tertiary amino-alcohol is then treated with thionyl chloride to produce N-(o-methyl-phenoxyisopropyl)-N-benzyl-β-chloroethylamine hydrochloride, which melts at 153.5–154.5° C.

*Example 3*

N - (m - methylphenoxyisopropyl) - N - benzyl - β-chlorethylamine hydrochloride:

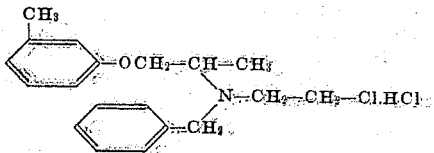

In the preparation of this compound the procedure of Example 2 will be followed using as a starting material an equimolar amount of m-cresol in place of o-cresol. The m-cresol is converted with sodium hydroxide to the sodium salt, which is then refluxed with propylene chlorohydrin to obtain m-methylphenoxyisopropanol. Halogenation of the m-methylphenoxyisopropanol with thionyl chloride, as in Example 1, forms m-methylphenoxyisopropyl chloride, B. P. 96.5–98° C. at 5 mm., which, in turn, is reacted with ethanolamine to form the secondary amino alcohol N-(m-methylphenoxyisopropyl)-ethanolamine, M. P. 57–58° C. The benzyl group is introduced into the molecule by heating the secondary amino alcohol together with benzyl chloride. The resulting tertiary amino alcohol is converted with thionyl chloride to N-(m-methylphenoxyisopropyl)-N-benzyl-β-chlorethylamine hydrochloride, M. P. 133–134° C.

Example 4

N - (p - methylphenoxyisopropyl) - N - benzyl-β-chlorethylamine hydrochloride:

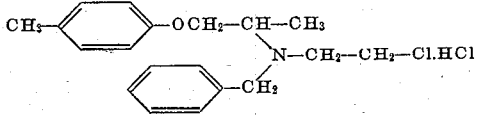

A solution of 216 g. of p-cresol, 300 ml. of alcohol, 80 g. of sodium hydroxide and 85 ml. of water is heated to reflux while 188 g. of propylene glycol is added dropwise with stirring. The mixture is refluxed five hours, filtered and most of the alcohol removed under reduced pressure. The residue is dissolved in benzene, washed with sodium hydroxide solution and distilled to give 1 - (p - methylphenoxy) - 2 - propanol boiling at 101–106° C. /4 mm.

A stream of dry air is passed through 272 g. of cooled 1-(p-methylphenoxy)-2-propanol while 143 g. of thionyl chloride is added dropwise. After three hours another 143 g. portion of thionyl chloride is added, followed by 3 ml. of dry pyridine. The reaction mixture is heated at 70–80° C. for 4½ hours, diluted with benzene, washed with sodium bicarbonate solution and distilled. The 1-(p-methyl-phenoxy)-2-chloropropane distills at 76–77° C. at 2 mm.

The chloro compound (225 g.) is introduced dropwise into 223 g. of refluxing ethanolamine. After three hours, the mixture is poured into water and the water-insoluble material is taken up in ether. The amine is extracted into dilute hydrochloric acid, the acid solution is made basic and extracted with ether. Distillation of the solvent leaves the solid N-(p-methylphenoxyisopropyl) ethanolamine, which melts at 68–70° C. after recrystallization from hexane.

A mixture of 100 g. of the above secondary amino alcohol, 60 g. of benzyl chloride, 25 g. of sodium carbonate and 500 ml. of alcohol is stirred and refluxed for nine hours. Half of the alcohol is distilled off and the concentrated mixture is refluxed an additional three hours. The product is isolated by adding water, extracting the oil into ether and distilling. N-(p-methylphenoxyisopropyl)-N-benzylethanolamine is collected at 159–163° C./0.22 mm.

Dry hydrogen chloride is passed into a solution of 69 g. of the tertiary amino alcohol and 200 ml. of chloroform. When the solution is acid, 30 g. of thionyl chloride is added and the solution refluxed for two hours. Removal of the solvent and recrystallization of the residue from alcohol and ether gives N-(p-methylphenoxyisopropyl)-N-benzyl-β-chlorethylamine hydrochloride which melts at 138–140° C.

Example 5

N - (o - chlorophenoxyisopropyl) - N - benzyl-β - chlorethylamine hydrochloride:

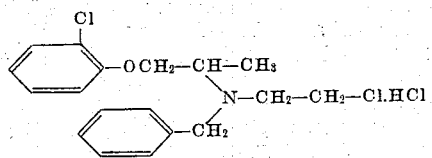

The procedure of Example 4 will be followed in the preparation of this compound using an equimolar amount of o-chlorophenol to replace p-cresol as a starting material to form 1-(o-chlorophenoxy)-2-propanol which distills at 109–114° C. at 3 mm. and forms a p-nitrobenzoate ester which melts at 97–97.5° C.

The halogenation of the alcohol with thionyl chloride prepares the 1-(o-chlorophenoxy)-2-chloropropane, B. P. 111–114° C. per 5 mm., which is reacted with ethanolamine to form the secondary amino alcohol N-(o-chlorophenoxyisopropyl)-ethanolamine. The introduction of the N-benzyl group is accomplished by heating the secondary amino alcohol with benzyl chloride. The resulting tertiary amino alcohol is treated with thionyl chloride to produce N-(o-chlorophenoxyisopropyl)-N-benzyl-β- chlorethylamine hydrochloride, M. P. 164–166° C.

Example 6

N - (p - chlorophenoxyisopropyl) - N - benzyl-β-chlorethylamine hydrochloride:

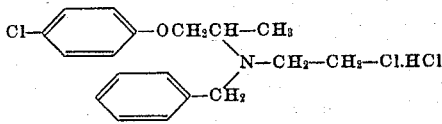

In this preparation the procedure of Example 4 will be followed using p-chlorophenol as a starting material. The p-chlorophenol is converted with sodium hydroxide to the sodium salt which is refluxed with propylene chlorohydrin to obtain the p-chlorophenoxyisopropanol, which distils at 125–130° C. at 6 mm. and forms a p-nitrobenzoate ester, M. P. 76.5–77° C.

The end product is prepared as described in Example 4 by halogenation of the p-chlorophenoxyisopropanol with thionyl chloride to form p-chlorophenoxyisopropyl chloride, B. P. 84–90° C. at 2 mm.; M. P. 37–39° C., which, in turn, is reacted with ethanolamine to form the secondary amino alcohol N-(p-chlorophenoxyisopropyl)-ethanolamine. The N-benzyl group is introduced by heating the secondary amino alcohol with benzyl chloride. The resulting tertiary amino alcohol is then treated with thionyl chloride to produce N-(p-chlorophenoxyisopropyl)-N-benzyl-β-chlorethylamine hydrochloride, M. P. 158.5–159° C.

Example 7

N-(p-methoxyphenoxyisopropyl)-N- benzyl-β-chlorethylamine hydrochloride:

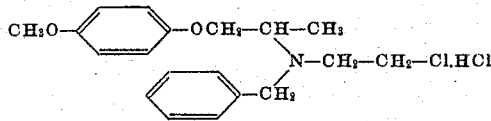

A solution of 372 g. of p-methoxyphenol, 500 ml. of alcohol, 120 g. of sodium hydroxide and 140 ml. of water is heated to reflux while 282 g. of propylene chlorohydrin is added with stirring over a two hour period. The mixture is refluxed for three hours, cooled and filtered to remove sodium chloride. Most of the alcohol is distilled at reduced pressure and the residue is dissolved in 600 ml. of benzene. The benzene solution is extracted with 10% sodium hydroxide solution, then with water and the solvent is evaporated. The solid residue is p-methoxyphenoxyisopropanol, which melts at 63–64° C. after recrystallization from benzene-petroleum ether.

A slow stream of dry air is passed into a solution of 300 g. of p-methoxyphenoxyisopropanol and 1500 ml. of dry benzene while 146 g. of thionyl chloride is added dropwise with cooling.

After six hours another 146 g. portion of thionyl chloride is added and the solution allowed to stand overnight. Three cc. of dry pyridine is then added and the solution refluxed for six hours. The cooled benzene solution is poured into water and washed repeatedly with sodium bicarbonate solution. Distillation of the solvent followed by distillation of the residue in vacuo yields p-methoxyphenoxyisopropyl chloride, B. P. 90–95° C./1 mm.

The 1-(p-methoxyphenoxy)-2-chloropropane is reacted with ethanolamine to form the secondary amino alcohol N-(p-methoxyphenoxyisopropyl)-ethanolamine, M. P. 53–55° C. The N-benzyl group is introduced by heating the secondary amino alcohol with benzyl chloride. The resulting tertiary amino alcohol is then treated with thionyl chloride to produce N-(p-methoxyphenoxyisopropyl)-N-benzyl-β-chlorethylamine hydrochloride, which melts at 152–153° C.

Example 8

N-(o-tert.-butylphenoxyisopropyl)-N-benzyl-β-chlorethylamine hydrochloride:

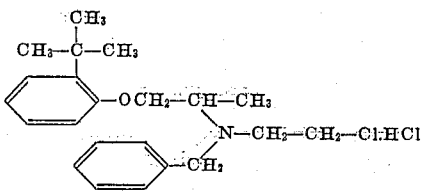

The procedure of Example 4 will be followed in the preparation of this compound using an equimolar amount of o-tert.-butylphenol to replace p-cresol as a starting material. In the first step 1-(o-tert.-butylphenoxy)-2-propanol is formed.

The halogenation of the secondary alcohol with thionyl chloride prepares the 1-(o-tert.-butylphenoxy)-2-chloropropane which is reacted with ethanolamine to form the secondary amino alcohol N-(o-tert.-butylphenoxyisopropyl)-ethanolamine. The introduction of the N-benzyl group is accomplished by heating the secondary amino alcohol with benzyl chloride. The resulting tertiary amino alcohol is treated with thionyl chloride to produce N-(o-tert.-butylphenoxyisopropyl)-N-benzyl-β-chlorethylamine hydrochloride.

Example 9

N-(phenoxyisopropyl)-N-(o-methylbenzyl)-β-chlorethylamine hydrochloride:

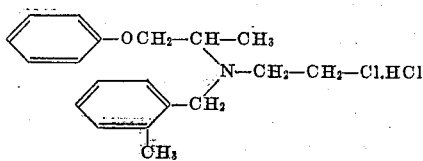

N-(phenoxyisopropyl)-ethanolamine, an intermediate in the synthesis of Example 1, is employed as starting material. The amino alcohol is reacted with o-methylbenzyl chloride in alcohol solution in the presence of sodium bicarbonate in the same manner as described under Example 1 for benzyl chloride. The final step, reaction with thionyl chloride, is conducted in chloroform solution as described above to produce N-(phenoxyisopropyl)-N-(o-methylbenzyl)-β-chlorethylamine hydrochloride, M. P. 118° C.

Example 10

N-(phenoxyisopropyl)-N-(p-methoxybenzyl)-β-chlorethylamine hydrochloride:

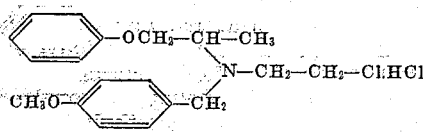

N-(phenoxyisopropyl) ethanolamine, an intermediate in the synthesis of Example 1, is employed as starting material. A solution of 39 g. of N-(phenoxyisopropyl)-ethanolamine, 16 g. of p-methoxybenzyl chloride and 100 ml. of dry benzene is refluxed for six hours. One hundred ml. of water is added and the layers separated. After removal of the benzene, the residue is distilled to yield a small amount of starting amino alcohol and 22 g. of N-phenoxyisopropyl-N-(p-methoxybenzyl)-ethanolamine, B. P. 142–157° C. at 0.2 mm.

Twenty-one grams of the above tertiary amino alcohol is dissolved in 100 ml. of chloroform and dry hydrogen chloride is introduced until the solution is acid. Ten grams of thionyl chloride in 25 ml. of chloroform is added, the solution is warmed to 35° C. for one-half hour and then refluxed for an hour. Removal of the solvent in vacuo leaves an oil which solidifies on addition of ether. The solid is collected and recrystallized from alcohol and ether, M. P. 146.5–147.5° C.

Example 11

N-(phenoxyisopropyl)-N-(3,4-dichlorobenzyl)-β-chlorethylamine hydrochloride:

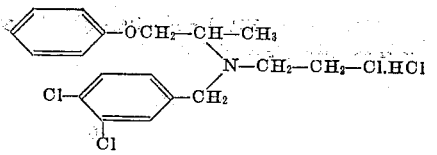

N-(phenoxyisopropyl)-ethanolamine, an intermediate in the synthesis of Example 1, is employed as starting material. The amino alcohol is reacted with 3,4-di-chlorobenzyl chloride in alcohol solution in the presence of sodium bicarbonate in the same manner as described under Example 1 for benzyl chloride. The final step, reaction with thionyl chloride, is conducted in chloroform solution as described above to produce N-(phenoxyisopropyl)-N-(3,4-dichlorobenzyl)-β-chlorethylamine hydrochloride which melts at 145–146° C.

Example 12

N-(phenoxyisopropyl)-N-(3,4-dimethoxybenzyl)-β-chlorethylamine hydrochloride:

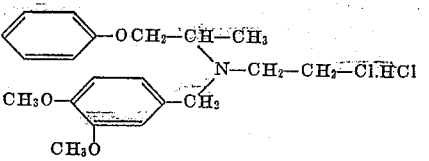

N-(phenoxyisopropyl)-N-ethanolamine, an intermediate in the synthesis of Example 1, is employed as starting material.

A solution of 48 g. of N-(phenoxyisopropyl)-ethanolamine, 28 g. of 3,4-dimethoxybenzyl bromide and 150 ml. of toluene is heated gradually from room temperature to 110° C. over a period of 1½ hours and held at that temperature for an hour. The cooled reaction mixture is extracted with water and the organic layer distilled. After removal of the solvent, the residue is distilled in vacuo, yielding N-phenoxyisopropyl - N - (3,4 - dimethoxybenzyl) - ethanolamine which distils at 188–189° C. at 0.08 mm. The final step, reaction with thionyl chloride, is conducted in chloroform solution as described above to produce N-phenoxyisopropyl-N-(3,4-dimethoxybenzyl) - β - chlorethylamine hydrochloride, M. P. 128.5–129.5° C.

*Example 13*

N - (o - methylphenoxyisopropyl) - N - (o-methylbenzyl)-β-chlorethylamine hydrochloride:

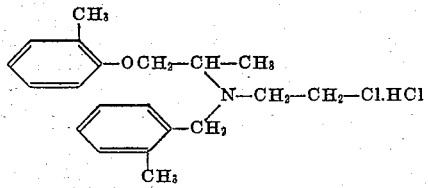

N-(o-methylphenoxyisopropyl) ethanolamine, an intermediate in the synthesis of Example 2, is employed as a starting material. The amino alcohol is reacted with o-methylbenzyl chloride in alcohol solution in the presence of sodium bicarbonate in the same manner as described under Example 1 for benzyl chloride. The final step, reaction with thionyl chloride, is conducted in chloroform solution as described above to produce N-(phenoxyisopropyl)-N-(o-methylbenzyl)-β-chlorethylamine hydrochloride.

*Example 14*

N - (phenoxyisopropyl) - N - benzyl - 1 - amino-2-chloropropane hydrochloride:

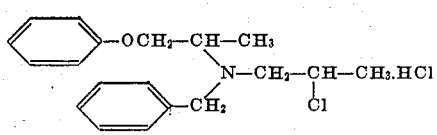

In the preparation of this compound the 1-phenoxyisopropyl-2-chloropropane is reacted with isopropanolamine instead of ethanolamine under the conditions described in Example 1. The resulting secondary amino alcohol, M. P. 69–71° C. is treated with benzyl chloride to prepare the N-benzyl derivative, which distils at 149–151.5° C./0.2 mm. The resulting tertiary amino alcohol is converted to the halide by treatment with thionyl chloride to produce N-(phenoxyisopropyl) - N - benzyl - 1 - amino - 2 - chloropropane hydrochloride, M. P. 146–147° C.

*Example 15*

N-(phenoxyisopropyl)-N - benzyl - β - bromoethylamine hydrobromide:

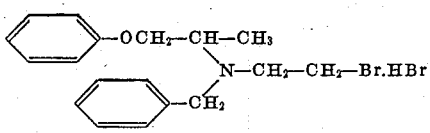

N-(phenoxyisopropyl)-N-benzyl - β - hydroxyethylamine is formed as an intermediate in the process in Example 1. In the final step the tertiary amino alcohol is reacted with hydrogen bromide and thionyl bromide in place of hydrogen chloride and thionyl chloride to form N-(phenoxyisopropyl)-N - benzyl - β - bromoethylamine hydrobromide, M. P. 134.5–136.5° C.

*Example 16*

N-(p-tert.-butylphenoxyisopropyl)-N - benzyl-β-chlorethylamine hydrochloride:

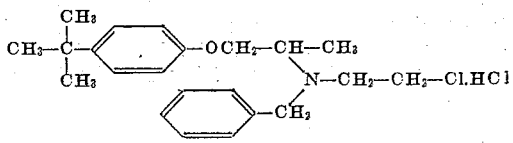

The procedure of Example 1 will be followed in the preparation of this compound, replacing the 1-phenoxy-2-propanol with an equimolar amount of 1-(p-tertiary-butyl-phenoxy)-2-propanol as a starting material. The halide of this alcohol which is formed by reaction with thionyl chloride is reacted with ethanolamine to form the secondary amino alcohol N-(p-tertiary-butyl phenoxyisopropyl) - N - ethanolamine. The introduction of the N-benzyl group is accomplished as described in Example 1 in the presence of sodium bicarbonate. The resulting tertiary amino alcohol is converted to the halide by reaction with thionyl chloride to form N-(p-tert.-butylphenoxyisopropyl)-N-benzyl-β - chlorethylamine hydrochloride, M. P. 158.5–159° C.

*Example 17*

N-(o-sec.-butylphenoxyisopropyl)-N - benzyl-β-chlorethylamine hydrochloride:

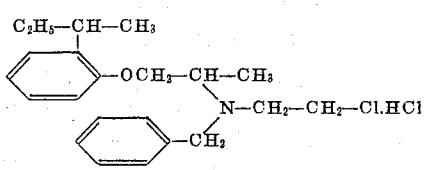

The procedure of Example 1 will be followed in the preparation of this compound, replacing the 1-phenoxy-2-propanol with an equimolar amount of 1-(o-sec.-butyl phenoxy)-2-propanol as a starting material. The halide, B. P. 118–124° C./4 mm., of this alcohol, which is formed by reaction with thionyl chloride, is reacted with ethanolamine to form the secondary amino alcohol 1-(o-sec.-butyl phenoxy)-2-propyl ethanolamine, M. P. 69.5–71.5° C. The introduction of the N-benzyl group is accomplished as described in Example 1 in the presence of sodium bicarbonate. The resulting tertiary amino alcohol which distills at 162–172° C. at 0.35 mm. is converted to the halide by reaction with thionyl chloride to form N-(o-sec.-butylphenoxyisopropyl)-N-benzyl-β-chlorethylamine hydrochloride, M. P. 142–144° C.

*Example 18*

N-(p-hydroxyphenoxyisopropyl)-N-benzyl - β-chlorethylamine hydrochloride:

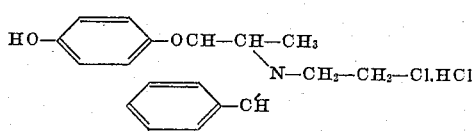

To prepare this compound, N-(p-benzyloxyphenoxyisopropyl)-N-benzyl-β - chlorethylamine hydrochloride (Example 19) is refluxed with 6 N alcoholic hydrochloric acid for 2 hours. This treatment removes the o-benzyl group and the p-hydroxy compound is recovered by concentrating the acid solution, M. P. 139–141° C.

Example 19

N-(p-benzyloxyphenoxyisopropyl)-N-benzyl-β-chlorethylamine hydrochloride:

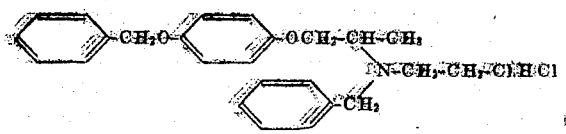

1-(p-benzyloxyphenoxy)-2-propanol is prepared from hydroquinone monobenzyl ether and propylene chlorohydrin in the manner described in previous examples. The crude product separates from reaction mixture on cooling and is redissolved by addition of more alcohol. The 1-(p-benzyloxyphenoxy)-2-propanol, M. P. 104-105° C. is purified by recrystallization from benzene.

A chloroform solution of 1-(p-benzyloxyphenoxy)-2-propanol is treated with thionyl chloride as described for Example 4. The chloro compound is recrystallized from alcohol and melts at 67-69° C.

One hundred grams of 1-(p-benzyloxyphenoxy)-2-chloropropane is added portionwise to 66 g. of boiling ethanolamine. After three hours, the mixture is poured into water, the solid collected and recrystallized from benzene, M. P. 121-122° C.

Fifty-five grams of N-(p-benzyloxyphenoxyisopropyl)-ethanolamine is benzylated with 23 g. of benzyl chloride as described in Example 4. Dry hydrogen chloride is passed into an ether solution of the crude product to form the hydrochloride salt which melts at 109.5-112° C. after recrystallization from acetone.

The N-(p-benzyloxyphenoxyisopropyl)-N-benzylethanolamine is treated with thionyl chloride in chloroform solution as described in previous examples to form the β-chlorethylamine hydrochloride, M. P. 152-154° C.

Example 20

N-(p-benzylphenoxyisopropyl)-N-benzyl-β-chlorethylamine hydrochloride:

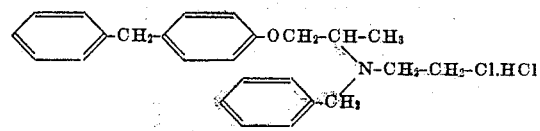

In this preparation the procedure of Example 4 will be followed using as a starting material an equimolar amount of p-benzylphenol in place of p-cresol. The sodium salt of the p-benzylphenol which is prepared with sodium hydroxide is refluxed together with propylene chlorohydrin to obtain p-benzylphenoxyisopropanol.

The end product is formed in the manner described under Example 4 by halogenation of the p-benzylphenoxyisopropanol in benzene solution with thionyl chloride to form the halide of the compound which, in turn, is reacted with ethanolamine to form the secondary amino alcohol. The N-benzyl group is then introduced as described in Example 4 by heating the secondary amino alcohol with benzyl chloride. The resulting tertiary amino alcohol is then reacted with thionyl chloride to produce N-(p-benzylphenoxyisopropyl)-N-benzyl-β-chlorethylamine hydrochloride.

Example 21

N-(o-bromophenoxyisopropyl)-N-benzyl-β-chlorethylamine hydrochloride:

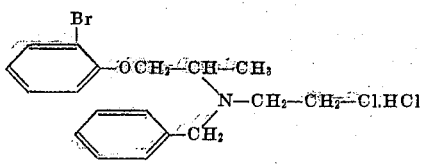

In this preparation the procedure of Example 4 will be followed using as a starting material an equimolar amount of o-bromophenol in place of p-cresol. The sodium salt of the o-bromophenol which is prepared with sodium hydroxide is refluxed together with propylene chlorohydrin to obtain o-bromophenoxyisopropanol.

The end product is formed in the manner described under Example 4 by halogenation of the o-bromophenoxyisopropanol with thionyl chloride to form the halide of the compound which, in turn, is reacted with ethanolamine to form the secondary amino alcohol. The N-benzyl group is then introduced as described in Example 4 by heating the secondary amino alcohol with benzyl chloride. The resulting tertiary amino alcohol is then reacted with thionyl chloride to produce N-(o-bromophenoxyisopropanol)-N-benzyl-β-chlorethylamine hydrochloride.

Example 22

N-(phenoxyisopropanol)-N-(p-chlorobenzyl)-β-chlorethylamine hydrochloride:

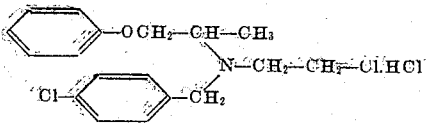

N-(phenoxyisopropanol)-ethanolamine is heated in alcohol solution with p-chlorobenzyl chloride in the presence of sodium bicarbonate as described in the third step of Example 1. The product of the reaction, N-(phenoxyisopropanol)-N-(p-chlorobenzyl)-ethanolamine, distills at 165-170° C. at 0.3 mm.

The above tertiary amino alcohol is treated with thionyl chloride in chloroform solution in the same manner as described for Example 1 to form N-(phenoxyisopropyl)-N-p-chlorobenzyl-β-chlorethylamine hydrochloride which melts at 143-144° C.

Example 23

N-(m-methoxyphenoxyisopropyl)-N-benzyl-β-chlorethylamine hydrochloride:

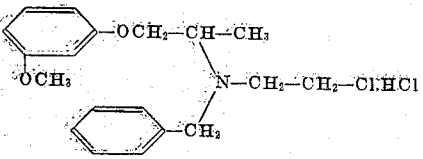

In this preparation the procedure of Example 4 is followed using as a starting material an equimolar amount of resorcinol monomethyl ether in place of p-cresol. The 1-(m-methoxyphenoxy)-2-propanol so formed distils at 107-110° C./1 mm. and is converted into 1-(m-methoxyphenoxy)-2-chloropropane by reaction with thionyl chloride as described under Example 4. Alkylation of ethanolamine by the chloro compound produces N-(m-methoxyphenoxyisopropyl)-ethanolamine which is benzylated with benzyl chloride in alcohol solution in the presence of sodium carbonate.

Finally, the tertiary amino alcohol is heated with thionyl chloride in chloroform solution to produce the β-chlorethylamine hydrochloride.

Example 24

N-(3,4-dimethylphenoxyisopropyl) - N-benzyl-β-chlorethylamine hydrochloride:

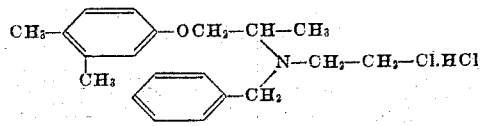

This compound is prepared in the same manner as Example 4 with the substitution, in the first step, of 3,4-dimethylphenol for p-cresol. It melts at 143–145° C.

Example 25

N - (2 - isopropyl - 5 - methylphenoxyisopropyl) - N - benzyl - β - chlorethylamine hydrochloride:

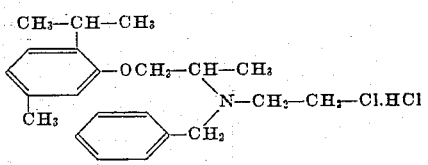

In the procedure of Example 4, thymol replaces p-cresol as a starting material. When the sodium salt of thymol is heated in alcohol solution with propylene chlorohydrin, 1-(2-isopropyl-5-methylphenoxy)-2-propanol is formed. This is halogenated by means of thionyl chloride to produce 1-(2-isopropyl-5-methylphenoxy)-2-chloropropane which is employed to alkylate ethanolamine. The secondary amine is benzylated and the hydroxy group is replaced by chlorine as described in Example 4 to yield the final product, M. P. 107–109° C.

Example 26

N - (o - isopropylphenoxyisopropyl) - N - benzyl-β-chlorethylamine hydrochloride:

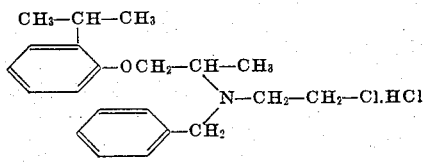

With o-isopropylphenol as a starting material in place of p-cresol, the procedure of Example 4 is followed. In the first step an alcoholic solution of sodium salt of o-isopropylphenol is refluxed with propylene chlorohydrin to form the ether, 1-(o-isopropylphenoxy)-2-propanol which is reacted with thionyl chloride. The resulting chloro compound when added to refluxing ethanolamine forms N-(o-isopropylphenoxyisopropyl)-ethanolamine which is benzylated with benzyl chloride. Finally, thionyl chloride in chloroform solution is employed to convert the tertiary amino alcohol to N-(o-isopropylphenoxyisopropyl)-N-benzyl-β-chlorethylamine hydrochloride. M. P. 113.5–115.5° C.

Example 27

N-(p-sec.-butylphenoxyisopropyl)-N-benzyl-β-chlorethylamine hydrochloride:

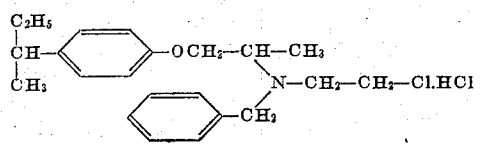

This compound is prepared in the same manner as Example 1, using 1-(p-sec.-butylphenoxy)-2-propanol in place of 1-phenoxy-2-propanol. Reaction of the alcohol with thionyl chloride forms 1-(p-sec.-butylphenoxy)-2-chloropropane which is employed to alkylate ethanolamine. Benzylation with benzyl chloride as described in Example 1 yields the N-benzyl amino alcohol. The final step comprises reaction of the tertiary amino alcohol with thionyl chloride in chloroform solution. The β-chlorethylamine hydrochloride melts at 131–132° C.

Example 28

N - (phenoxyisopropyl) - N - (2,4 - dichlorobenzyl)-β-chlorethylamine hydrochloride:

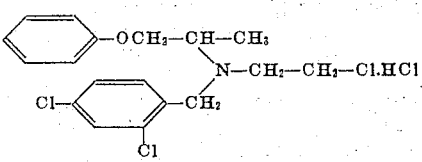

A mixture of 24 g. of N-(phenoxyisopropyl)-ethanolamine, prepared as described in Example 1, 24 g. of 2,4-dichlorobenzyl chloride, 10.3 g. of anhydrous sodium bicarbonate and 250 ml. of alcohol is stirred and refluxed for ten hours and then 150 ml. of alcohol is removed by distillation. The concentrated reaction mixture is poured into water and the organic material extracted into ether. The ether solution is dried and distilled to give N-(phenoxyisopropyl)-N-(2,4-dichlorobenzyl)-ethanolamine, B. P. 119–121° C. at 2 mm.

Twenty grams of the above compound is dissolved in 100 ml. of dry chloroform. Anhydrous hydrogen chloride is introduced until the solution is acid and then 8.4 g. of thionyl chloride is added. After the solution is refluxed for two hours, the solvent is evaporated at reduced pressure and the crude product is recrystallized from alcohol and ether. The purified N-(phenoxyisopropyl) - N - (2,4 - dichlorobenzyl) - β - chlorethylamine hydrochloride melts at 116–118.5° C.

Example 29

N - (o - ethylphenoxyisopropyl) - N - benzyl-β-chlorethylamine hydrochloride:

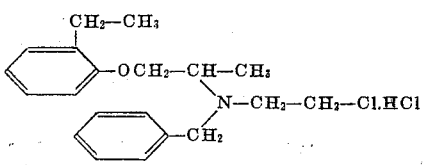

With o-ethylphenol as starting material, this compound is prepared by the process described in Example 4.

Example 30

N-(o - propylphenoxyisopropyl) - N - benzyl-β-chlorethylamine hydrochloride:

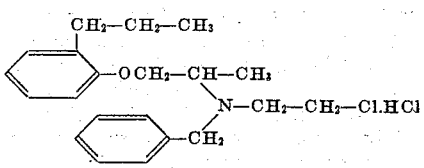

The preparation of this compound is effected by following the directions under Example 4, substituting equal molar proportions of o-propylphenol for p-cresol.

Example 31

N-(o-butylphenoxyisopropyl)-N-benzyl-β-chlorethylamine hydrochloride:

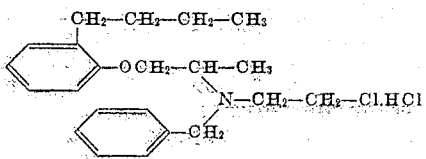

By replacing the p-cresol of Example 4 by a stoichiometrically equivalent amount of o-butylphenol and following generally the procedure of Example 4, there is obtained the above β-chlorethylamine hydrochloride.

Example 32

N-(o-isobutylphenoxyisopropyl)-N-benzyl-β-chlorethylamine hydrochloride:

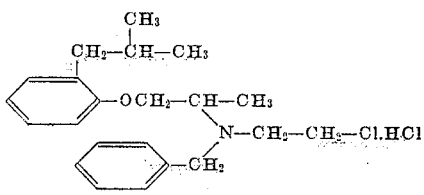

The procedure of Example 4 will be followed using an equivalent amount of o-isobutylphenol in place of p-cresol.

Example 33

N-(o-methoxyphenoxyisopropyl)-N-benzyl-β-chlorethylamine hydrochloride:

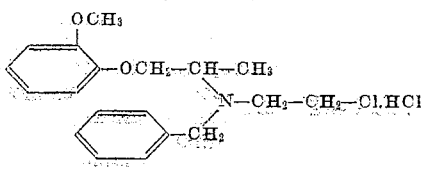

The procedure of Example 4 is followed using guaiacol as the starting material in place of p-cresol. In the first step 1-(o-methoxyphenoxy)-2-propanol is formed and this is converted, with thionyl chloride, into 1-(o-methoxyphenoxy)-2-chloropropane. Reaction of the chloro compound with ethanolamine produces N-(o-methoxyphenoxyisopropyl) ethanolamine, M. P. 56–57° C., which is benzylated by means of benzyl chloride. Finally the hydroxy group is replaced by chlorine with thionyl chloride.

Example 34

N-(o-benzylphenoxyisopropyl)-N-benzyl-β-chlorethylamine hydrochloride:

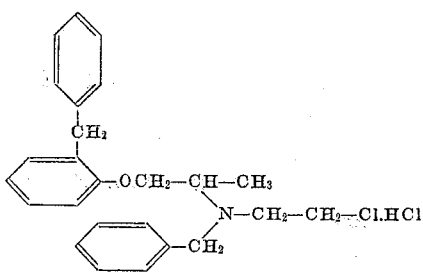

With o-benzylphenol as the starting material the procedure of Example 4 will be followed to produce the above compound, M. P. 134.5–136.5° C.

Example 35

N-(p-fluorophenoxyisopropyl)-N-benzyl-β-chlorethylamine hydrochloride:

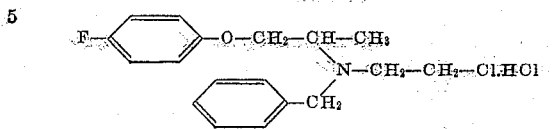

A sodium ethoxide solution was prepared by the addition of 6.9 g. of sodium to 250 ml. of absolute ethanol to which was added, with stirring, 33.6 g. of p-fluorophenol. Propylene chlorohydrin was added to the resulting clear solution and the mixture was refluxed overnight. The sodium chloride was removed by filtration, the alcohol by distillation, and the resulting oil was fractionated to yield 1-(p-fluorophenoxy)-2-propanol boiling at 130–131° C. at 17 mm. This compound was converted to the chloride by treatment of 25.3 g. of the alcohol with 23 g. of thionyl chloride. After the ensuing vigorous reaction had subsided the mixture was shaken and allowed to stand until the evolution of hydrogen chloride had ceased. Several drops of pyridine were added and the flask, fitted with a drying tube, was allowed to stand for 12 hours. The mixture was then refluxed on a steam bath, the thionyl chloride removed under vacuum and the resulting oil taken up into ether. After washing the ethereal solution with dilute hydrochloric acid, followed by drying with Drierite, the ether was removed by distillation and the residual 1-(p-fluorophenoxy)-2-chloropropane was distilled off, B. P. 110–111° C. at 15 mm.

A mixture of 37.8 g. of the above prepared 1-(p-fluorophenoxy)-2-chloropropane and 61 g. of redistilled ethanolamine was heated for 16 hours at 150° with vigorous agitation. After cooling a solution of 12 g. of potassium hydroxide in absolute ethanol was added and the precipitated salt was removed by filtration. Drying the alcohol solution over Drierite, and distillating off the alcohol the residual oil distilled to yield the secondary amino ethanol which boiled at 152–153° C. at 4 mm. The distillate solidified upon cooling and was recrystallized from acetone to give colorless crystals melting at 71.8–72.4° C.

A mixture containing 100 ml. of absolute ethanol, 17 g. of the secondary amino alcohol prepared above, 10.1 g. of benzyl chloride and 6.9 g. of potassium carbonate was refluxed for 24 hours with efficient stirring. Solid material was removed by filtration of the alcohol by distillation and the crude residual oil was dissolved in 200 ml. of 10% hydrochloric acid. Cooling the acid solution to 5° C., 6.9 g. of solid sodium nitrite was added slowly with vigorous stirring. After ½ hour the cold solution was extracted with two 100 ml. portions of ether, made basic with a 30% solution of sodium hydroxide and the basic solution was extracted with three 100 ml. portions of ether. After drying these combined ether extracts over Drierite the ether was removed by distillation and the resulting oil fractionated to yield N-benzyl-N-[β-(p-fluorophenoxy)-isopropyl]-ethanolamine, boiling at 180–181° C. at 0.4 mm.

9.2 g. of the tertiary amine prepared above was added gradually to 25 ml. of redistilled thionyl chloride. After the initial vigorous reaction had subsided the mixture was refluxed for 1 hour and the excess thionyl chloride was removed under reduced pressure. Several recrystallizations of the residue from absolute ethanol and ether provided N-(p-fluorophenoxy-isopropyl)-N-benzyl-β-chlorethylamine hydrochloride, melting at 136–137° C.

Example 36

N - (o-fluorophenoxyisopropyl)-N - benzyl - β-chloroethylamine hydrochloride:

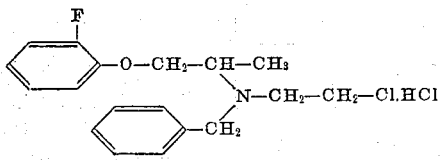

This compound was prepared using a procedure identical with that described above with the exception that o-fluorophenol was utilized as a starting material in place of p-fluorophenol. The o-fluoro isomer so prepared had a melting point of 158–159° C. after recrystallization.

In the foregoing examples hydrochlorides and hydrobromides according to this invention are exemplified. However, it will be understood and readily appreciated by those skilled in the art that the foregoing examples will illustrate the structure of organic or inorganic salts generally and will serve as specific examples of those organic and inorganic salts heretofore mentioned specifically by the writing in the several foregoing illustrative structures of the chemical symbols for the several acid groups heretofore specifically mentioned or of the acid group of any other desired organic or inorganic acid for the HCl or HBr in the several foregoing examples, respectively.

It will similarly be self-evident to those skilled in the art that in the foregoing examples illustrative of the production of chloride hydrochlorides by the procedures described, bromide hydrobromides will be produced with the use, for example, of thionyl bromide in place of thionyl chloride in the final step. Thus, the foregoing specific examples of chloride hydrochlorides serve as specific examples of bromide hydrobromides by simply replacing Cl.HCl in the several formulae with Br.HBr.

The foregoing examples illustrate the salts contemplated by this invention. The bases contemplated by this invention according to the broad and more particular structural formulae herein disclosed are specifically exemplified as will be obvious to anyone skilled in the art by reference to the foregoing specific examples with the removal from the structures illustrated thereby of the acid group, i. e., HCl or HBr.

As will be apparent, the organic and inorganic salts contemplated by this invention will be prepared from the bases in a manner usual and well known to those skilled in the art, as by neutralizing the bases with organic or inorganic acids.

The bases contemplated by this invention will be formed by carefully interacting the salts contemplated by this invention and herein exhaustively exemplified with one molecular equivalent of a strong alkali such, for example, as sodium hydroxide, potassium hydroxide, lithium hydroxide, or the like, in aqueous solution say, for example, a 1–10% solution at room temperature or below and the bases so liberated are isolated with the aid of a water-immiscible solvent such as ether or benzene. The preparation of free bases from salts is illustrated under Example 1.

The compounds contemplated by this invention will be variously optically inactive or optically active and it will be understood that the optically inactive and optically active forms of the compounds contemplated by this invention are all included within the scope of this invention.

The various types of compounds having the structure embodying this invention as illustrated by the above specific examples and examples of the various types of compounds will be readily prepared by the general methods of preparation described above as exemplified by the description of the preparation of the several specific examples. The starting material for the preparation of any given compound within the structure contemplated by this invention will be found among known compounds, or, its structure being obvious with reference to any particular compound desired to be prepared, will be readily prepared by known methods.

This is a continuation-in-part of our application Serial Number 97,926, filed June 8, 1949, now abandoned.

What is claimed is:

1. A compound of the class consisting of a free base and its acid addition salts, the free base having the formula:

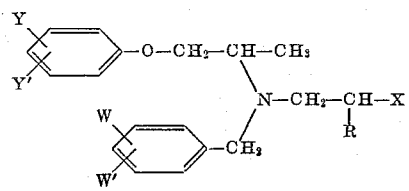

in which Y and Y' are members of the group consisting of hydrogen, alkyl containing not more than 4 carbon atoms, benzyl, hydroxy, methoxy, benzyloxy, fluorine, chlorine and bromine; W and W' are members of the group consisting of hydrogen, methyl, methoxy and chlorine; R is a member of the group consisting of hydrogen and methyl; and X is a member of the group consisting of chlorine and bromine.

2. The compound having the structure:

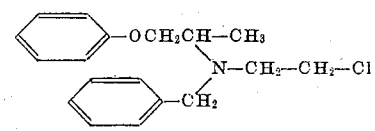

3. The compound having the structure:

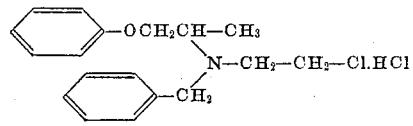

4. The compound having the structure:

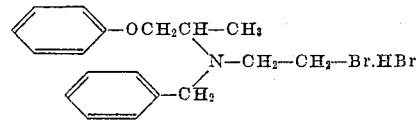

5. The compound having the structure:

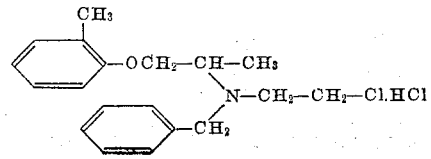

6. The compound having the structure:
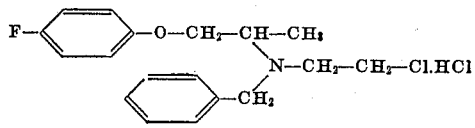
JAMES F. KERWIN.
GLENN E. ULLYOT.
REFERENCES CITED
The following references are of record in the file of this patent:
UNITED STATES PATENTS
| Number | Name | Date |
|---|---|---|
| 2,495,772 | Rieverschl et al. | Jan. 31, 1950 |